(12) United States Patent
Nelson et al.

(10) Patent No.: US 8,500,389 B2
(45) Date of Patent: Aug. 6, 2013

(54) GAS DRIVEN ROTATION MOTOR, A TOOL PROVIDED WITH A GAS DRIVEN ROTATION MOTOR AND A METHOD FOR REGULATING SPEED OF A GAS DRIVEN ROTATION MOTOR

(75) Inventors: Anders Urban Nelson, Älvsjö (SE); Sten Herman Olsson, Nacka (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 552 days.

(21) Appl. No.: 12/809,176

(22) PCT Filed: Dec. 18, 2008

(86) PCT No.: PCT/SE2008/000726
§ 371 (c)(1),
(2), (4) Date: Jun. 18, 2010

(87) PCT Pub. No.: WO2009/082324
PCT Pub. Date: Jul. 2, 2009

(65) Prior Publication Data
US 2011/0236180 A1    Sep. 29, 2011

(30) Foreign Application Priority Data
Dec. 20, 2007    (SE) ....................... 0702834

(51) Int. Cl.
*F04D 27/02*    (2006.01)

(52) U.S. Cl.
USPC ............... 415/1; 415/80; 415/904; 415/30

(58) Field of Classification Search
USPC .............. 415/13, 30, 80, 81, 82, 904; 416/44; 384/523; 464/901; 475/196
See application file for complete search history.

(56) References Cited

U.S. PATENT DOCUMENTS

| | | | |
|---|---|---|---|
| 3,477,315 A * | 11/1969 | Macks | 475/149 |
| 3,552,410 A | 1/1971 | Amtsberg | |
| 3,631,742 A * | 1/1972 | Hoffmeister | 475/196 |
| 6,179,552 B1 | 1/2001 | Jacobsson | |
| 8,292,569 B2 * | 10/2012 | Sitzler | 415/25 |

FOREIGN PATENT DOCUMENTS

DE    1875308    5/1963

OTHER PUBLICATIONS

International Search Report dated Mar. 18, 2009 issued in International Appln. No. PCT/SE2008/000726 & Preliminary Report.

* cited by examiner

*Primary Examiner* — Edward Look
*Assistant Examiner* — Juan G Flores
(74) *Attorney, Agent, or Firm* — Holtz, Holtz, Goodman & Chick, PC

(57) ABSTRACT

A gas driven motor includes a housing, a gas driven rotating member including a rotor and a rotor shaft carrying the rotor and journalled in a first bearing and a second bearing supported in the housing, and a speed governor for controlling a pressure gas inlet flow in response to the rotation speed of the rotating member. The first bearing includes a set of rolling elements, an outer race arranged in the housing and an inner race arranged on a shaft portion of the rotating member, the set of rolling elements being in contact with the races on which the rolling elements roll. The motor further includes a coupling device arranged to couple the speed governor to the rolling elements of the first bearing, thereby transferring the rotary motion from the rolling elements to the speed governor.

20 Claims, 4 Drawing Sheets

GAS DRIVEN ROTATION MOTOR, A TOOL PROVIDED WITH A GAS DRIVEN ROTATION MOTOR AND A METHOD FOR REGULATING SPEED OF A GAS DRIVEN ROTATION MOTOR

This application is a U.S. National Phase Application under 35 USC 371 of International Application PCT/SE2008/000726 filed Dec. 18, 2008.

BACKGROUND OF THE INVENTION

The present invention relates to a gas driven rotation motor, a tool provided with a gas driven rotation motor and a method for regulating the rotation speed of a gas driven rotation motor.

Gas driven rotation motors, or pneumatic motors, are used in machines with rotating tools such as grinding machines, milling machines, drilling machines, etc. In particular, gas driven rotation motors are used in portable power tools and hand held power tools for a number of different applications including construction, manufacturing, dental machines, artists' works etc.

Vane motors and turbine motors are the most common types of gas driven or pneumatic motors. In the turbine motor the rotation speed is considerably higher than in the vane motor. For both types of motors, speed governors are used to regulate the inflow of air, or other gas if such is used, to the motor and thereby limiting to a maximum the rotation speed at idle running. It is particularly important to be able to control the rotation speed (rpm) of tools with high speed turbine motors, for instance in grinding machines because in grinder applications there is a risk for explosion or centrifugal disintegration of the grinding disc should the motor speed exceed a certain safety level at idle running. Breaking up of the grinding tool in this way would be very hazardous for the operator and other people and equipment in the vicinity of the tool in operation. The purpose of the speed governor is to restrict the air inlet flow for the rotor when the motor speed approaches the safety level, but to let through an unrestricted air flow at the normal working speed of the motor. There is a particular problem to have mechanical speed governors operate properly at high speed motors like turbines. Usually, also some kind of overspeed safety or shutoff device is provided.

Centrifugally operated and rotatably driven speed governors or regulators are previously known. In U.S. Pat. No. 6,179,552 is disclosed a speed governor ("speed control unit") for a turbine motor. The speed governor includes two or more flyweight members mounted in a bore in the rotor. The overspeed safety device includes an elastically deformable spring element arranged to be radially bent by centrifugal action to hit and release a trip element in order to thereby free an airflow restricting element.

Another type of centrifugally driven speed governor has been in use since the 1960's, a so called ball speed governor as disclosed in DE1875308U. This speed governor includes weights in the form of balls that roll in a conical seat. Such a speed governor is also illustrated in FIG. 1 and FIG. 2, having reference number 4. This speed governor is normally used with vane type rotation motors having a fairly low rotation speed. In order to use such a speed governor with a turbine motor, some type of gear arrangement must be used between the rotor and the speed governor in order to reduce the rotation speed to a level at which the speed governor is operable.

The purpose of the present invention is to provide a tool having a gas driven rotation motor that can easily be connected to a centrifugally driven speed governor, for example such speed governors that already exists on the market. A further object of the invention is to provide a safe-failure design for this critical component.

SUMMARY OF THE INVENTION

The object of the present invention is achieved by means of a gas driven rotation motor according to a first aspect, a tool in accordance with a second aspect, and a method in accordance with a third aspect.

According to the first aspect of the invention, a gas driven rotation member comprises a rotor and a rotor shaft carrying the rotor and journalled in a first bearing and a second bearing supported in the housing, a speed governor for controlling a pressure gas inlet flow in response to the rotation speed of the rotating member, said first bearing comprising a set of rolling elements an outer race arranged in the housing and an inner race arranged on a shaft portion of the rotating member, said set of rolling elements being in contact with said races on which the rolling elements roll. The motor further includes a coupling device arranged to couple the speed governor to the rolling elements of the first bearing, thereby transferring the rotary motion from the rolling elements to the speed governor.

According to a first embodiment, the coupling device includes a set of pins, which pins are adapted to be in contact with the rolling elements of the first bearing, and whereby the rotary motion of the rolling elements is transferred to the coupling device, and the coupling device includes connection means for connecting it with the speed governor, whereby the rotary motion is further transferred from the coupling device to the speed governor.

According to a further feature of the first embodiment, the pins, in the set of pins, are adapted to be inserted between the rolling elements of the first bearing, thereby also functioning as retainers for the rolling elements. According to an alternative, second embodiment, the first bearing comprises a retainer device for the rolling elements, and the coupling device includes a set of pins arranged to be in contact with the retainer device of the first bearing whereby the rotary motion of the rolling elements is indirectly transferred to the coupling device, via the retainer device, and that the coupling device includes connection means for connecting it with the speed governor, whereby the rotary motion is further transferred from the coupling device to the speed governor.

In accordance with a further aspect of the invention, the gas driven rotation motor comprises a spring arrangement for biasing the outer race, the inner race, the rolling elements, and the pins of the coupling device in a direction towards each other, thereby securing frictional contact between the outer race, the inner race, the rolling elements, and the pins of the coupling device.

In a particular embodiment of the spring arrangement, the outer race is axially movable and the motor comprises a spring arrangement for biasing the outer race in a direction towards the coupling device, thereby securing frictional contact between the outer race, the inner race, the rolling elements, and the pins of the coupling device.

According to the second aspect of the invention, a tool is provided with the above-described gas driven rotation motor, and wherein the shaft is provided with a holder arrangement for a rotating implement.

Further, according to the third aspect of the invention, a method is provided for regulating the rotation speed of a gas driven rotating member comprising a rotor and a rotor shaft carrying the rotor and journalled in a first bearing and a second bearing supported in the housing, said first bearing comprising a set of rolling elements, an outer race arranged in the motor housing and an inner race arranged on a shaft portion of the rotating member, said set of rolling elements being in contact with said races on which the rolling elements roll. The method further comprises transferring the rotary motion from the set of rolling elements to a speed governor for controlling a pressure gas inlet flow in response to the rotation speed of the rotating member and thereby regulating the rotation speed of the motor.

By means of the present invention is provided a gas driven rotation motor of a less complex construction, and consequently less expensive when compared to prior art. It offers the possibility to use a centrifugally driven speed governor, e.g. of a previously known type, and it provides a safe-failure design for this critical component.

BRIEF DESCRIPTION OF THE DRAWINGS

An embodiment of the present invention is illustrated in the accompanying drawings, by way of example, in which.

DETAILED DESCRIPTION OF THE INVENTION

Figure 1:
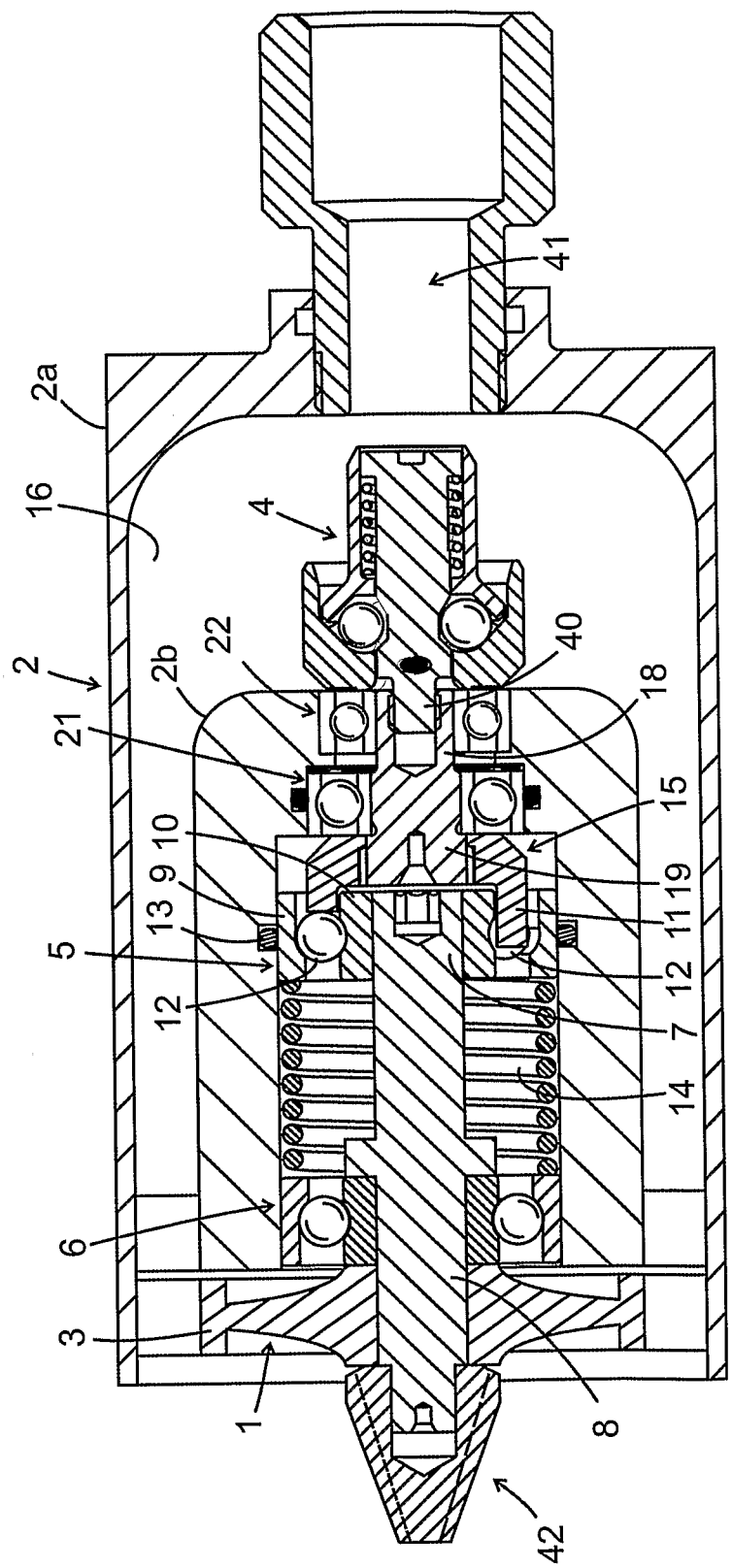
FIG. 1 shows schematically a gas driven rotation motor according to a first embodiment of the present invention, partly in a longitudinal section view.

In FIG. 1 is schematically shown a gas driven or pneumatic rotation motor. The rotation motor comprises a rotating member 1 arranged in a housing 2. A pressure gas, e.g. air, is supplied to the housing via a pressure gas inlet 41 and the rotating member is driven to rotate by the supplied pressure gas. In the illustrated example, the rotation motor is a turbine motor with a rotor 3, but the invention is not limited to turbine motors, for example the motor could also be a vane motor. Furthermore, the motor comprises a rotatable speed governor 4 for regulating the inflow of pressure gas to the rotating member, and a coupling device 15. The speed governor can be of a previously known type, as explained earlier, with a moveable part that can move into the pressure gas inlet 41.

The rotating member 1 comprises a rotor 3 and a rotor shaft 7,8 carrying the rotor and being journalled in the housing 2 by means of two ball bearings 5, 6. In this connection, it should be mentioned that in the figures, the housing is illustrated as having two parts, namely an external part 2a and an internal part 2b, for the bearings. It should be understood that these parts, and the channel 16 for the supplied pressure gas inside the housing, can be configured in many ways within the scope of the invention. For the sake of simplicity, in the description of this invention reference will only be made to the housing 2 taken as a whole.

To continue, the rotating member has two axially extending shaft portions, 7, 8. The first bearing 5 is fitted on the first, rear shaft portion 7 of the rotating member and the second bearing 6 is fitted on the second, front shaft portion 8 of the rotating member, which also constitutes the outgoing motor shaft onto which is provided a holder arrangement 42 for a rotating implement, e.g. a pinion gear or some tool carrying device. The ball bearings each comprise outer races 9 and inner races 10, and a set of rolling elements 12, of which only those that are part of the first, rear bearing 5 are indicated in FIG. 1. The inner race 10 of the first bearing 5 is fixed on the rear shaft portion 7, or could be integrated therewith. The outer race 9 is axially moveable, but is prevented from turning by means of an annular friction device 13 of rubber or other suitable resilient friction material, arranged in a groove in the housing 2, between the outer race and the housing. Furthermore, there is a spring arrangement 14 provided between the outer race 9 and the housing 2, working in an axial direction. By means of this spring 14, the axially moveable outer race 9 is biased in the rear direction, towards the coupling device, thereby securing frictional contact between the outer race 9, the inner race 10 and the rolling elements 12 and a fixed contact angle between these parts during use.

The coupling device 15 is rotatable and arranged to transfer the rotary motion of the rotating member 1 to the speed governor 4. The coupling device includes a rear part 18 adapted to be connected to a rotatable shaft 40 of a suitable speed governor 4. It further includes a front part 19 which includes a set of pins 11 projecting forward in the axial direction. The number of pins is equal to the number of rolling elements 12 of the first bearing 5 and the pins 11 are adapted to be in contact with the rolling elements, thereby functioning as carrier pins. The rotation of the rolling elements is thus transferred to the coupling device and from the coupling device to the speed governor 4. In the illustrated first embodiment of FIG. 1 and FIG. 3, the pins 11 are adapted to be inserted between each of the rolling elements 12 and thereby the pins also function as retainers for the rolling elements. Consequently, the bearing does not have any retainers. Since the rolling elements 12 rotate around the axis of the motor with a number of revolutions that is approximately half the number of revolutions of the rotating member 1, the rolling elements 12 function substantially as the planetary wheels of a planetary friction gear. The result is that the coupling device 5 and the connected speed governor 4 will also rotate considerably slower than the motor shaft 8. Through this reduction of the number of the revolutions it is possible to make use of a previously known, simple ball speed governor.

By providing pins 11 on the coupling device which also function as retainers, an additional safety function is obtained. If for some reason the speed governor 4 stops functioning and stops rotating, the pins 11 will stop the shaft rotation, either directly via frictional forces between the rolling elements and the shaft portion 7, or indirectly by causing the bearing arrangement or the motor itself to seize. Should the pins 11 wear down, the rolling elements 12 lose their position and ability to keep the shaft in position. Due to transverse gear forces and imbalance forces, the shaft would be subjected to such displacement that the rotational parts would immediately interfere with the stator parts and cause breakdown. The positive effect of this is that overspeeding of the motor is not possible if the speed governor stops functioning. As is illustrated in FIG. 1, the rotating coupling device is supported in the housing 2 by means of suitable bearings 21, 22.

It would be possible to modify the above described first embodiment to be adapted for ball bearings where the rolling elements are closely packed, and not having any space between them where the pins can be inserted and function as retainers. For such bearings, the pins of the coupling device would be made shorter in order to be in contact with the rolling elements, similar to what is described below with regard to the second embodiment. Also similar to that embodiment, this will result in that the safety function is not obtained.

Figure 2:
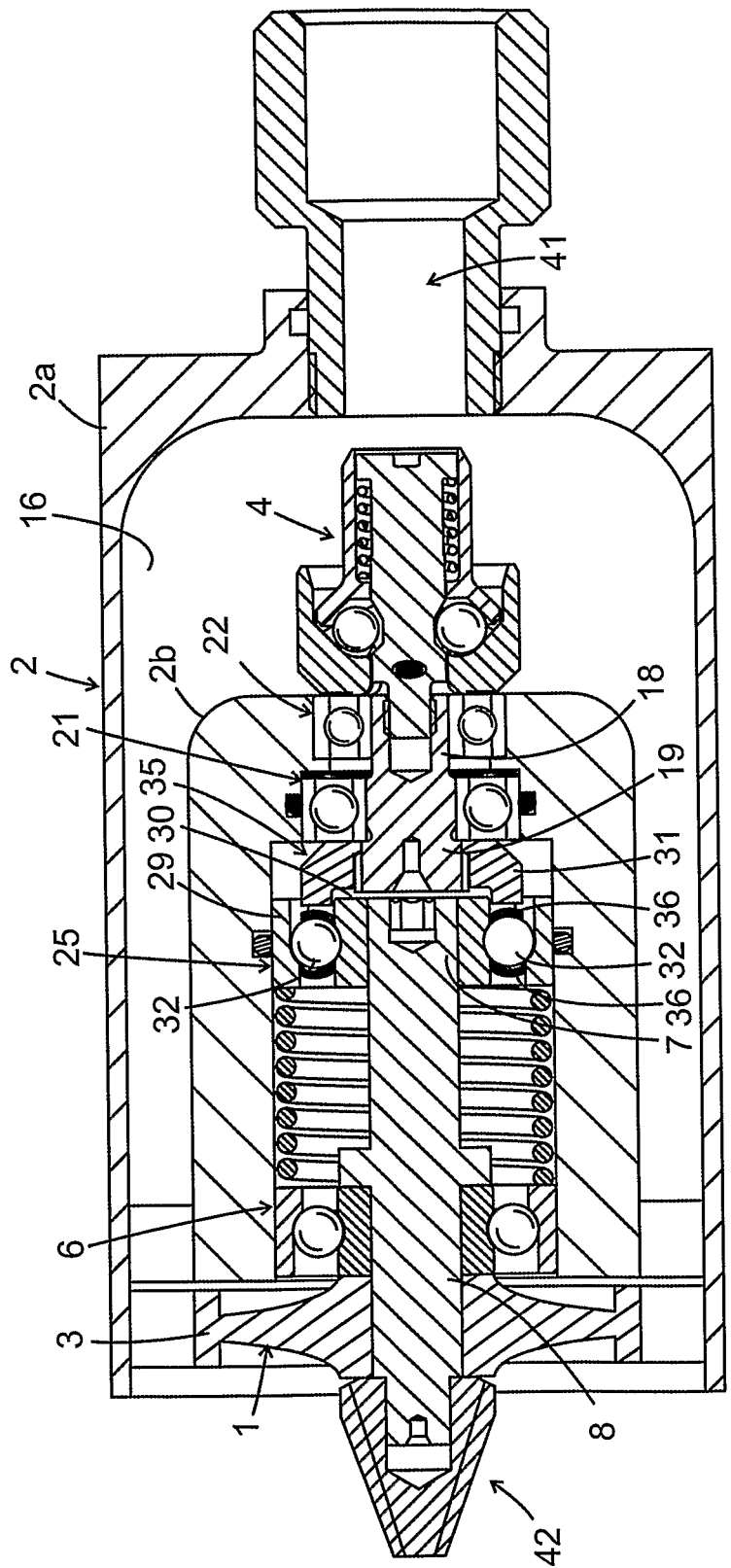
FIG. 2 shows schematically a gas driven rotation motor according to a second embodiment of the present invention, partly in a longitudinal section view.
Figure 3:
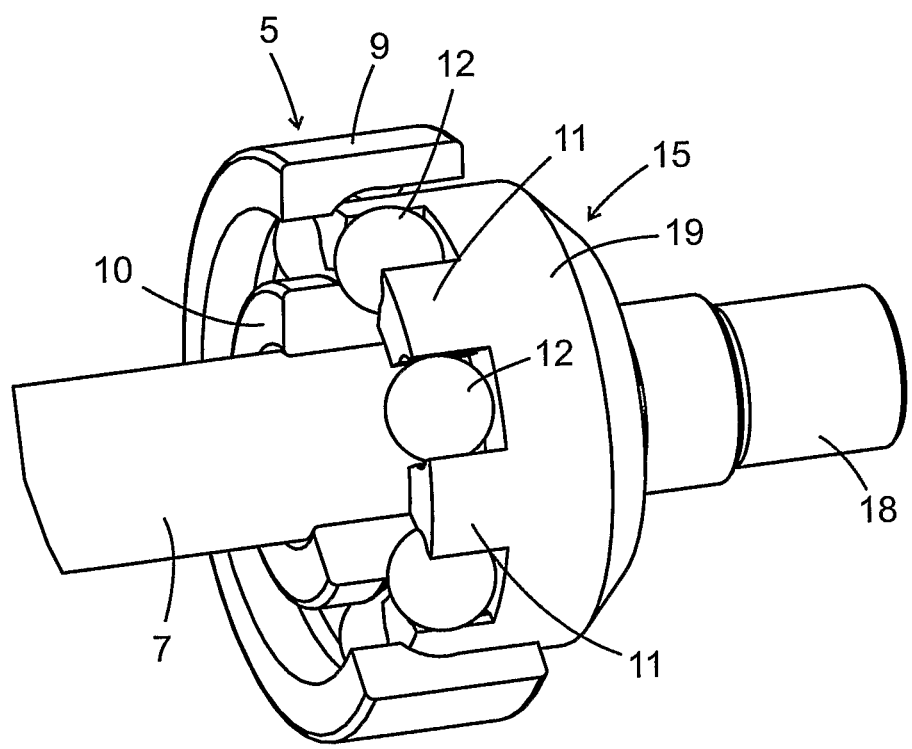
FIG. 3 shows schematically, in perspective and with cut out parts, a coupling device and a bearing for a gas driven rotation motor according to the present invention, according to the first embodiment.
Figure 4:
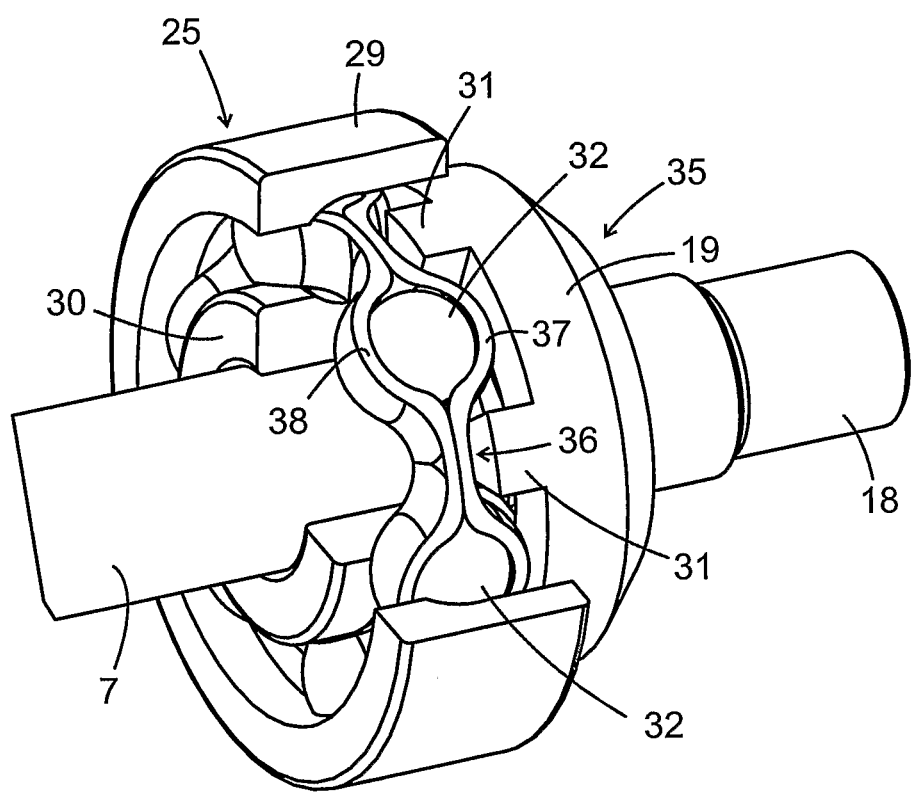
FIG. 4 shows schematically, in perspective and with cut out parts, a coupling device and a bearing for a gas driven rotation motor according to the present invention, according to the second embodiment.

As an alternative to the embodiment illustrated in FIGS. 1 and 3, a second embodiment is illustrated in FIGS. 2 and 4. In FIG. 2, only the coupling device 35 and the first bearing 25 are different from the first embodiment, the remaining parts of the motor are the same and consequently have the same reference numbers. According to this second embodiment, the first bearing 25 comprises outer races 29 and inner races 30, a set of rolling elements 32 and a retainer device 36 for the rolling elements. The retainer device may be of a regular type comprising a first part 37 and a second part 38, between which the rolling elements are held in place, as seen in FIG. 4. The pins 31 of the coupling device will then be shorter than in the first embodiment and adapted only to be in contact with the original retainer device, not themselves functioning as retainers. Through this alternative embodiment, the effect of the planetary gear is obtained, but the safety function described above will not be obtained. As in the first embodiment, the coupling device 35 will transfer the rotary motion of the rolling elements 32 to the speed governor 4. In the illustrated embodiments the first bearing has been shown as being a ball bearing. However, the invention is not limited to ball bearings since also other bearings are equally conceivable, e.g. roller bearings.

Generally, the present inventions should not be considered to be limited to the illustrated examples as further modifications are also possible within the scope of appended the claims, as will be readily recognisable by the skilled person.

The invention claimed is:

1. A gas driven rotation motor comprising:
a housing;
a gas driven rotating member comprising a rotor and a rotor shaft which carries the rotor and which is journalled in a first bearing and a second bearing supported in the housing;
a speed governor which controls a pressure gas inlet flow in response to a rotation speed of the rotating member, said first bearing comprising a set of rolling elements;
an outer race arranged in the housing and an inner race arranged on the shaft portion of the rotating member, said set of rolling elements being in contact with said races on which the rolling elements roll; and
a coupling device comprising a set of pins, which pins are adapted to transfer the rotary motion of the rolling elements to the coupling device,
wherein the coupling device further comprises a connection portion for connecting the coupling device with the speed governor, whereby the rotary motion is further transferred from the coupling device to the speed governor.

2. A gas driven rotation motor according to claim 1, wherein the set of pins of the coupling device are adapted to be in contact with the rolling elements of the first bearing, whereby the rotary motion of the rolling elements is transferred to the coupling device.

3. A gas driven rotation motor according to claim 2, wherein the pins comprising the set of pins are adapted to be inserted between the rolling elements of the first bearing, thereby also functioning as retainers for the rolling elements.

4. A gas driven rotation motor according to claim 3, further comprising a spring arrangement for biasing the outer race, the inner race, the rolling elements, and the pins of the coupling device in a direction towards each other, thereby securing frictional contact between the outer race, the inner race, the rolling elements, and the pins of the coupling device.

5. A gas driven rotation motor according to claim 3, wherein the outer race is axially movable, and wherein the motor comprises a spring arrangement for biasing the outer race in a direction towards the coupling device, thereby securing frictional contact between the outer race, the inner race, the rolling elements, and the pins of the coupling device.

6. A tool provided with the gas driven rotation motor according to claim 3, wherein the shaft is provided with a holder arrangement for a rotating implement.

7. A gas driven rotation motor according to claim 2, further comprising a spring arrangement for biasing the outer race, the inner race, the rolling elements, and the pins of the coupling device in a direction towards each other, thereby securing frictional contact between the outer race, the inner race, the rolling elements, and the pins of the coupling device.

8. A tool provided with the gas driven rotation motor according to claim 7, wherein the shaft is provided with a holder arrangement for a rotating implement.

9. A gas driven rotation motor according to claim 2, wherein the outer race is axially movable, and wherein the motor comprises a spring arrangement for biasing the outer race in a direction towards the coupling device, thereby securing frictional contact between the outer race, the inner race, the rolling elements, and the pins of the coupling device.

10. A tool provided with the gas driven rotation motor according to claim 2, wherein the shaft is provided with a holder arrangement for a rotating implement.

11. A gas driven rotation motor according to claim 1, wherein the first bearing comprises a retainer device for the rolling elements,
wherein the set of pins is arranged to be in contact with the retainer device of the first bearing, whereby the rotary motion of the rolling elements is indirectly transferred to the coupling device via the retainer device.

12. A gas driven rotation motor according to claim 11, further comprising a spring arrangement for biasing the outer race, the inner race, the rolling elements, and the pins of the coupling device in a direction towards each other, thereby securing frictional contact between the outer race, the inner race, the rolling elements, and the pins of the coupling device.

13. A gas driven rotation motor according to claim 11, wherein the outer race is axially movable, and wherein the motor comprises a spring arrangement for biasing the outer race in a direction towards the coupling device, thereby securing frictional contact between the outer race, the inner race, the rolling elements, and the pins of the coupling device.

14. A tool provided with the gas driven rotation motor according to claim 11, wherein the shaft is provided with a holder arrangement for a rotating implement.

15. A gas driven rotation motor according to claim 1, further comprising a spring arrangement for biasing the outer race, the inner race, the rolling elements, and the pins of the coupling device in a direction towards each other, thereby securing frictional contact between the outer race, the inner race, the rolling elements, and the pins of the coupling device.

16. A tool provided with the gas driven rotation motor according to claim 15, wherein the shaft is provided with a holder arrangement for a rotating implement.

17. A gas driven rotation motor according to claim 1, wherein the outer race is axially movable, and wherein the motor comprises a spring arrangement for biasing the outer race in a direction towards the coupling device, thereby securing frictional contact between the outer race, the inner race, the rolling elements, and the pins of the coupling device.

18. A tool provided with the gas driven rotation motor according to claim 17, wherein the shaft is provided with a holder arrangement for a rotating implement.

19. A tool provided with the gas driven rotation motor according to claim 1, wherein the rotor shaft is provided with a holder arrangement for a rotating implement.

20. A method for regulating the rotation speed of a gas driven rotation motor including a gas driven rotating member comprising a rotor and a rotor shaft which carries the rotor and is journalled in a first bearing and a second bearing supported in the housing, said first bearing comprising a set of rolling elements, and an outer race arranged in the motor housing and an inner race arranged on the shaft portion of the rotating member, said set of rolling elements being in contact with said races on which the rolling elements roll, the method comprising;

providing a coupling device comprising a set of pins, adapting the pins to transfer rotary motion of the rolling elements to the coupling device, and connecting the coupling device to a speed governor which controls a pressure gas inlet flow in response to a rotation speed of the rotating member, thereby regulating the rotation speed of the motor.

* * * * *